United States Patent
Yeh et al.

(10) Patent No.: US 7,082,489 B2
(45) Date of Patent: Jul. 25, 2006

(54) DATA MEMORY CONTROLLER THAT SUPPORTS DATA BUS INVERT

(75) Inventors: Bi-Yun Yeh, Taoyuan Hsien (TW); Jiin Lai, Taipei (TW); Sheng-Chung Wu, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 490 days.

(21) Appl. No.: 10/172,332

(22) Filed: Jun. 14, 2002

(65) Prior Publication Data

US 2003/0041223 A1 Feb. 27, 2003

(30) Foreign Application Priority Data

Jul. 12, 2001 (TW) ............................... 90117038 A

(51) Int. Cl.
*G06F 13/14* (2006.01)
*G06F 12/00* (2006.01)
*G06F 1/32* (2006.01)

(52) U.S. Cl. ..................... 710/305; 710/106; 711/167
(58) Field of Classification Search ............... 710/100, 710/305, 307, 310; 711/5, 137; 365/189.05, 365/23
See application file for complete search history.

(56) References Cited

U.S. PATENT DOCUMENTS

| | | | |
|---|---|---|---|
| 5,113,369 A * | 5/1992 | Kinoshita | 710/307 |
| 5,280,598 A * | 1/1994 | Osaki et al. | 710/310 |
| 5,608,882 A * | 3/1997 | Abert et al. | 710/307 |
| 5,613,078 A * | 3/1997 | Kishigami | 710/307 |
| 5,872,944 A * | 2/1999 | Goldrian et al. | 710/305 |
| 5,960,450 A * | 9/1999 | Lang et al. | 711/5 |
| 6,046,943 A * | 4/2000 | Walker | 365/189.05 |
| 6,295,246 B1 * | 9/2001 | Jeddeloh | 365/233 |
| 6,341,335 B1 * | 1/2002 | Kanai et al. | 711/137 |
| 6,499,072 B1 * | 12/2002 | Frank et al. | 710/100 |

* cited by examiner

*Primary Examiner*—Christopher E. Lee
(74) *Attorney, Agent, or Firm*—J.C. Patents

(57) ABSTRACT

The present invention provides a data memory controller that supports for the invert of data bus. Data transmitted from a memory is received in a chip set, which further transmits the data to a data processing apparatus. While receiving the memory data, the chip set doubles the bandwidth and reduces the frequency, such that the time margin for processing data is increased. In addition, after outputting data to the data processing apparatus, a first frame of data is compared to bus idle state to further reduce frequency of data invert and power consumption.

8 Claims, 8 Drawing Sheets

DATA MEMORY CONTROLLER THAT SUPPORTS DATA BUS INVERT

CROSS-REFERENCE TO RELATED APPLICATION

This application claims the priority benefit of Taiwan application 90117038, filed Jul. 12, 2001.

BACKGROUND OF THE INVENTION

1. Field of the Invention

The invention relates in general to a data memory controller, and more particularly, to a data memory controller to support data bus invert (DBI).

2. Description of the Related Art

As the computer has become a part of daily life, and more and more technologically advanced, its electrical demands are heavier and heavier. Reducing the power consumption of computers has become a very important topic.

A power saving method has been proposed in IEEE transactions on very large scale integrated (VLSI) systems, Vol. 3, No. 1, March 1995. This method applies the data bus invert mechanism. In U.S. Pat. No. 6,046,943, an output circuit for reducing data conversion is further developed, wherein the DBI is used to compare each bit of the current data and the previous data, and if it has half the number of total bits in difference over then an invert is taken and the DBI bit is set to be 1, simultaneously. However, if the data transmission does not support DBI function in transmitting memory data to the central processing unit (CPU), the bus state is often altered (from 1 to 0 or from 0 to 1), and more power is consumed.

For a personal computer, the north bridge functions as an interface between the central processing unit and the system memory (normally DRAM). The operation frequency for the current memory is much slower than the operation frequency of the central processing unit. Therefore, if the time margin of the chip set for processing the memory data can be enlarged, the signal process can be more precise.

SUMMARY OF THE INVENTION

The invention provides a data memory controller that supports data bus invert. By using the data bus invert, that is, when the data variation is diminished, the variation of the memory data output to the central processing unit is consequently diminished to achieve the objectives of saving power and increasing the time margin for data processing.

The data memory controller to support data bus invert is coupled to a memory and a central processing unit. The data memory controller includes at least an input data receiver, a data bus invert bit generator and a data access unit (FIFO). The input data receiver is coupled to the memory. The input data receiver doubles the bandwidth to reduce the transmission speed. The input data receiver receives a plurality of frames of 64 bit data output from the memory, and outputs a plurality of 64 bit data of a lower bit and a plurality of 64 bit data of a higher bit sequentially. The invert bit generator is coupled to the input data receiver to output data invert bit. The data access unit is coupled to the invert bit generator and the input data receiver to store an original data and the invert bit, and then is sent to the post data processor. In addition, the invention further provides an invert bit inspect circuit to compare the first frame of data sent to the post circuit with the idle state of the bus (the bus of the data memory controller and the post data processor). Thus, whether the original data has to be inverted is further confirmed. As the variation of memory data output to the CPU is minimized, the power consumption is reduced and the energy efficiency is increased. Further, the properties of accelerating bandwidth and reducing frequency for the input data receiver enlarge the time margin for processing memory data.

Both the foregoing general description and the following detailed description are exemplary and explanatory only and are not restrictive of the invention, as claimed.

DESCRIPTION OF THE PREFERRED EMBODIMENTS

Figure 1:
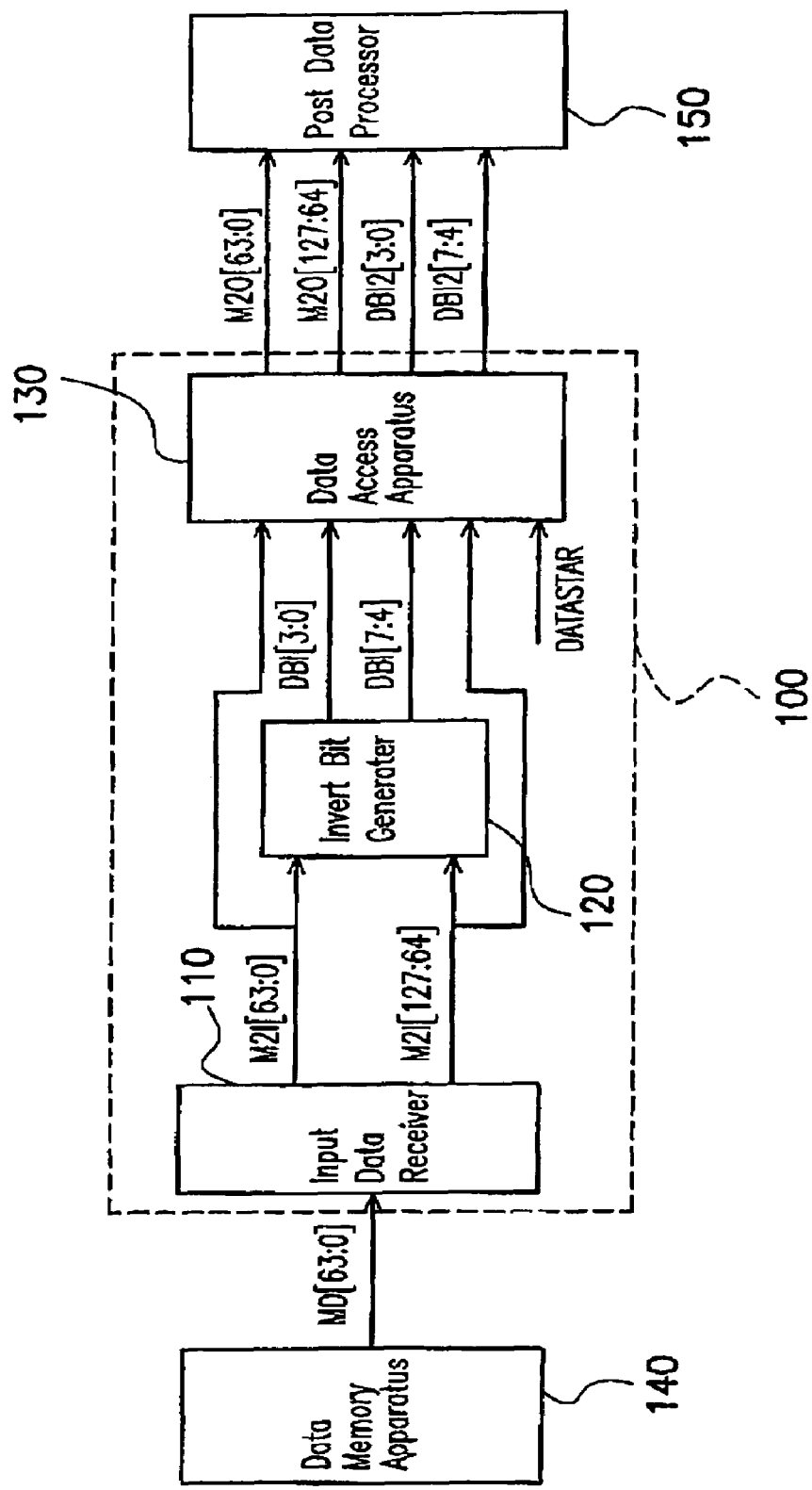
FIG. 1 is a block diagram showing the data memory controller that supports data bus invert, according to the present invention.
Figure 2A:
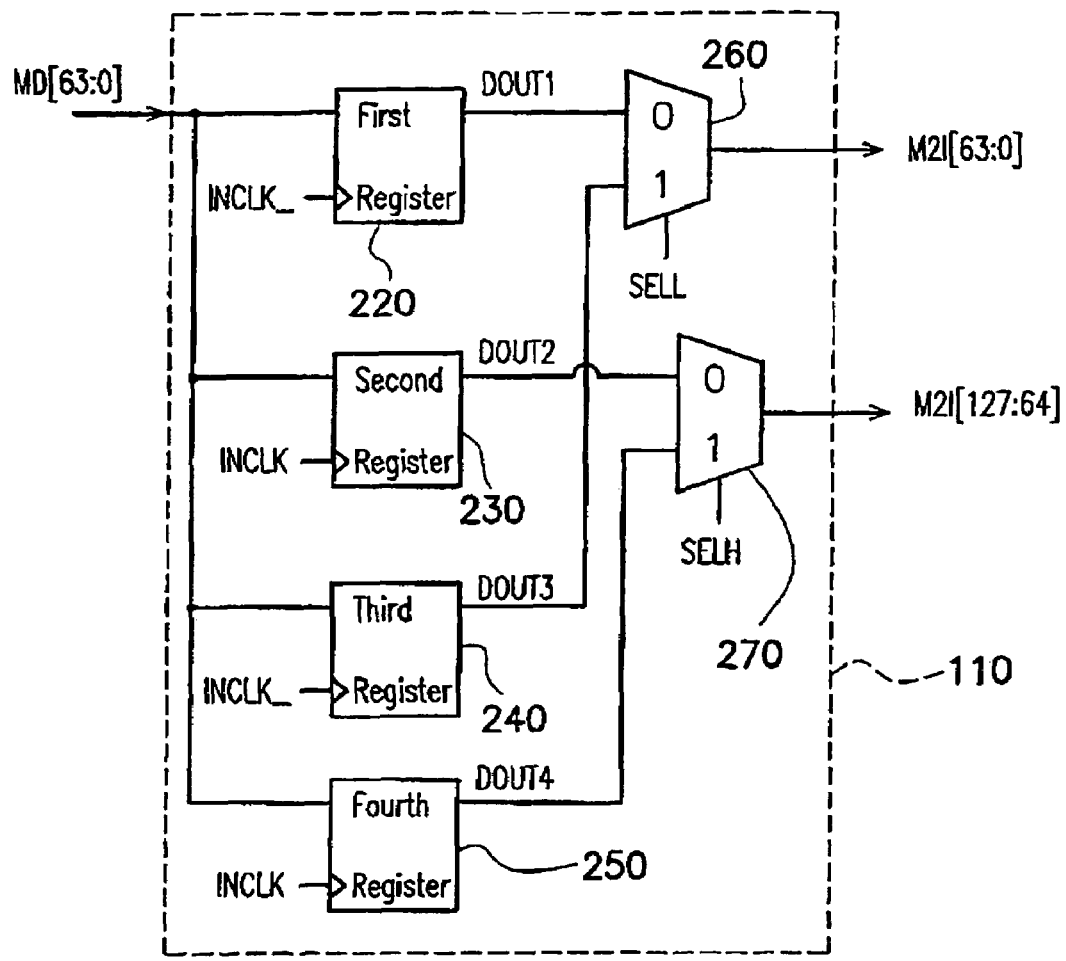
FIGS. 2a and 2b show the circuit diagram and the clock diagram of the input data receiver as shown in FIG. 1.

In FIG. 1, a data memory controller (for example, the north bridge chipset in a PC system) that supports data bus invert is illustrated. The data memory controller 100 comprises an input data receiver 110, an invert bit generator 120 and a data access apparatus (such as FIFO) 130. From FIG. 2b, the input data receiver 110 is capable of receiving a memory data output from the data memory apparatus, and then increasing a bandwidth of the memory data as well as reducing a frequency of the memory data. For example, FIG. 2a shows that the input data receiver 110 doubles the bandwidth (i.e. the input MD[63:0] has a bandwidth of one data/unit time interval while the output (the sum of M2I[63:0] and M2I[127:64]) has a bandwidth of two data/unit time interval) and reduces the frequency into a half (i.e. the period of the output (the period of either M2I[63:0] or M2I[127:64] is double that of the input of MD[63:0]) to increase the time margin of processing data. The input data receiver 110 is coupled to the data memory 140 (such as a DDR memory) to sequentially receive the 64 bit memory data MD[63:0] (with a frequency of 266 MHz) output from the data memory 140. The input data receiver 110 further sequentially outputs lower 64 bit memory data M2I[63:0] as a first data and higher 64 bit memory data M2I[127:64] as a second data. The frequency, for example 133 MHz, of the lower 64 bit memory data M2I[63:0] and the frequency, such as 133 MHz, of the higher 64 bit memory data M2I[127:64] is one half of the frequency of the MD[63:0]. The first data is selected from the memory data with a first sampling pattern; that is, the order of M2I[63:0] is two sequential even number bit data of the 64 bit MD[63:0]. The second data is selected from the memory data with a first sampling pattern; that is, the order of M2I[127:64] is two sequential odd number bit data of the 64 bit MD[63:0]. It is appreciated that one of ordinary skill in the art may obtain different combination for M2I in different manner without exceeding the protection scope of the invention.

The invert bit generator 120 is coupled to the input data receiver 110 to sequentially output a plurality low bit invert data DBI[3:0] and a plurality of high bit invert data DBI[7:4].

The data access apparatus 130 is coupled to the invert bit generator 120 and the input data receiver 110, so as to register M2I[63:0], M2I[127:64], DBI[3:0], and DBI[7:4]. The data will be accessed at a proper time, so as to output a plurality of lower bit memory data M2O[63:0], a plurality of higher bit memory data M2O[127:64], a plurality of low bit terminal invert data DBI2[3:0] and a plurality of high bit terminal invert data DBI[7:4] to the post data processor 150. The data access apparatus 130 transmits data to the post data processor 150 according to a push signal for activating a receiving action and another POP signal being activated. According to DBI2[3:0] and DBI2[7:4], the M2O[63:0], M2O[127:64] is determined to performed invert. At the same time, a multiplexer is used to double the frequency and reduce the bandwidth by half of the M2O and DBI2 after being inverted. Then, the results are sent to the CPU bus. The CPU then receives the data and the data is converted back according to the DBI quantity. Since the data has the DBI mechanism, the variation is reduced. Also and, the power consumption on the chipset is reduced.

Referring to FIG. 2a and FIG. 1, FIG. 2a shows the circuit diagram of the input data receiver of FIG. 1. The input data receiver 110 includes a first register 220, a second register 230, a third register 240, a fourth register 250, a first multiplexer 260, and a second multiplexer 270. The first register 220 is coupled to the data memory apparatus 140 to receive MD[63:0], and to output a first delay memory data DOUT1 according to a first clock invert signal INCLK_. The second register 230 is coupled to the data memory apparatus 140 to receive MD[63:0], and to output a second delay memory data DOUT2 according to a first clock signal INCLK. The third register 240 is coupled to the data memory apparatus 140 to receive MD[63:0], and to output a third delay memory data DOUT3 according to the first clock invert signal INCLK_. The fourth register 250 is coupled to the data memory apparatus 140 to receive MD[63:0], and to output a fourth delay memory data DOUT4 according to the first clock signal INCLK. The multiplexer 260 selects between DOUT1 and DOUT3 to output according to a first select signal SELL. When the SELL is low, the output is DOUT1. In contrast, when the SELL is high, the output is DOUT3. Similarly, the multiplexer 270 selects between DOUT2 and DOUT4 to output according to a second select signal SELH (the signal can be obtained by delaying SELL). When the SELH is low, the output is DOUT2. In contrast, when the SELH is high, the output is DOUT4.

Figure 2B:
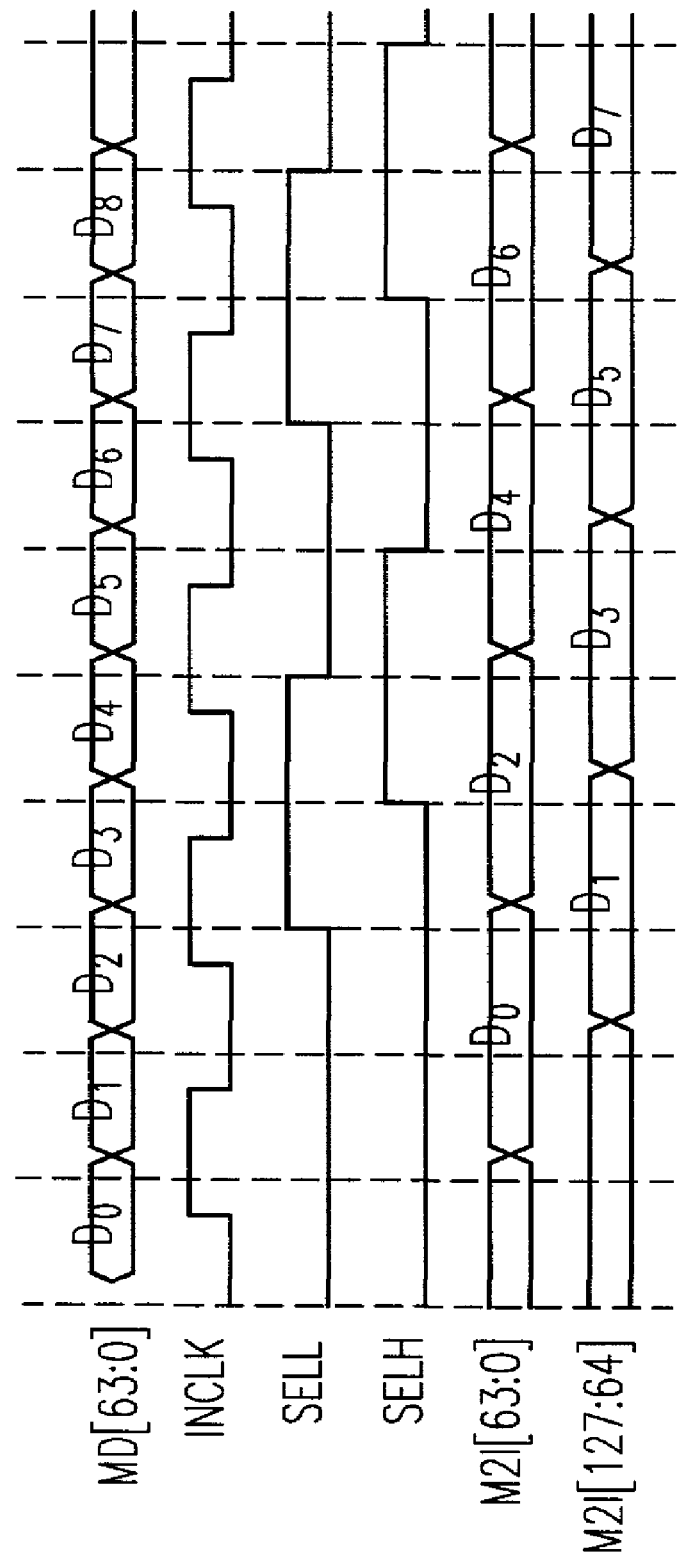

Refer to FIG. 2b, how the input data receiver doubles the bandwidth and halves the frequency of MD[63:0] to obtain M2I[63:0] and M2I[127:64]. Assuming that the data sequence of MD[63:0] is D0, D1, . . . , D63. According to the clock signals INCLK and INCLK_and the sequence relationship between the select signals SELL and SELH, how the input data receiver 110 performs the bandwidth double and frequency halve operations can be realized. When INCLK is L to H, the registers 220 and 240 receive data D0. Since SELL is L, the first multiplexer outputs DOUT1. When INCLK is H to L, the registers 230 and 250 are receiving D1. Since SELH is L, the second multiplexer outputs DOUT2 (D1). When INCLK is L to H, the registers 220 and 240 are receiving data D2. Since SELL is H, the first multiplexer is outputting DOUT3 (D2). When INCLK is H, the registers 230 and 250 are receiving data (D3). Since SELH is H, the second multiplexer is outputting DOUT4 (D3). D0, D2, . . . are called the lower bit memory data M2I[63:0] here, while D1, D3, . . . are called the higher bit memory data M2I[127:64]. M2I[63:0] and M2I[127:64] are sent to invert bit generator 120 to obtain invert bit. Since MI2[63:0] is the even bit data of MD[63:0] of two continuous data of 64 bits. That is, the content of M2I[63:0] includes D0, D2, . . . , D62 (the even number bit data of 64 bits) and D0, D2, . . . , D62 (the next even number bit data of 64 bits), and the content of M2I[127:64] includes D1, D3, . . . , D63 (the odd number bit data of next 64 bits) and D1, D3, . . . D63 (the next odd number bit data of next 64 bits).

Figure 3A:
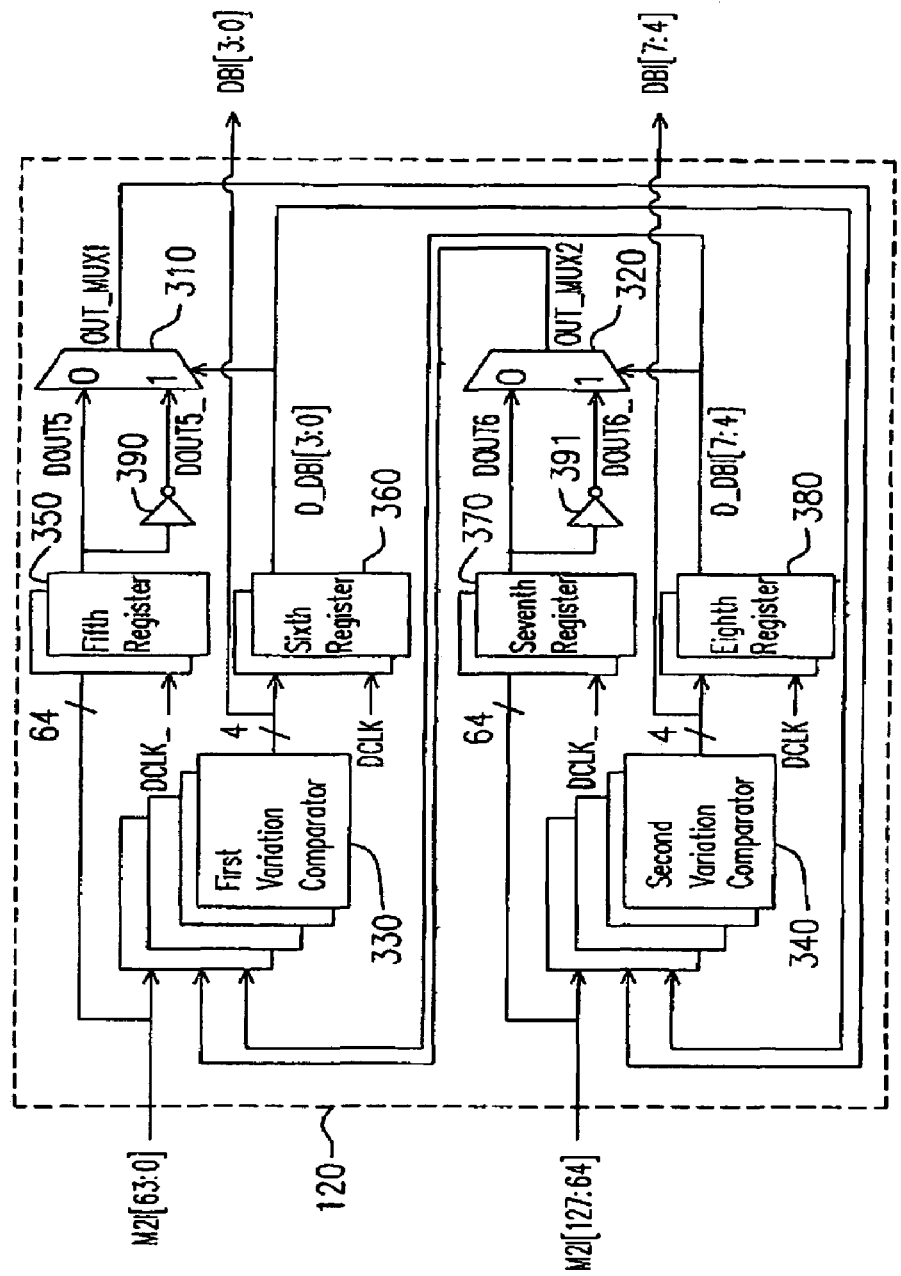
FIGS. 3a and 3b show the circuit diagram and the clock diagram of the invert bit generator as shown in FIG. 1.
Figure 3B:
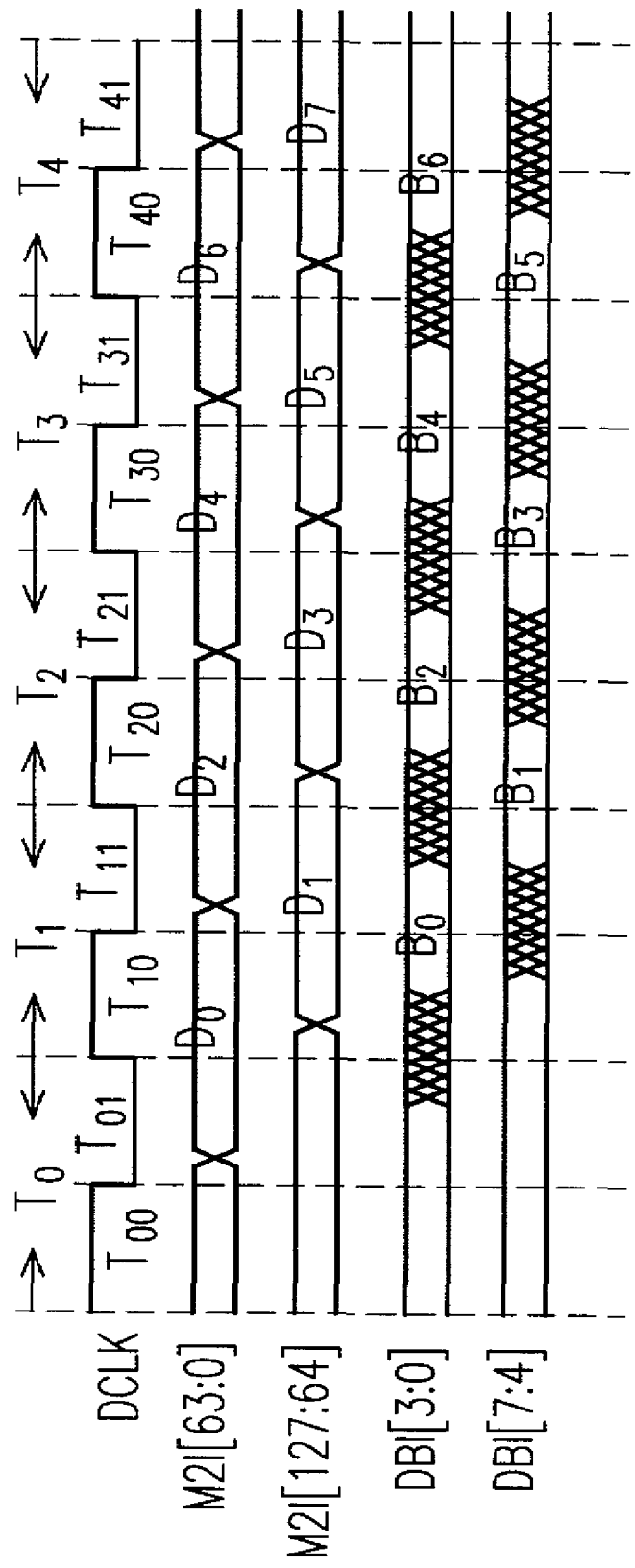

FIGS. 3a and 3b show the circuit diagram and the clock diagram of the invert bit generator 120 illustrated in FIG. 1. The invert bit generator 120 includes a third multiplexer 310, a fourth multiplexer 320, a first variation comparator 330, a second variation comparator 340, a fifth register 350, a sixth register 360, a seventh register 370, an eighth register 380, a first inverter 390 and a second inverter 391.

For the convenience of describing the invention, the second clock signal DCLK is divided into several cycles T0–T4. Each cycle is further divided into T00, T01, . . . . At T10, the multiplexer 320 outputs OUT_MUX2 to the first variation comparator 330 (not shown in FIG. 3b, but known as D63 of the previous MD[63:0], whether it is inverted is determined according to the invert bit D-DBI[7:4] sent from the eighth register 380). Therefore, the first variation comparator 330 compares D0 and OUT_MUX2 (or the inverted data thereof) to obtain the invert bit B0. At T11, the multiplexer 310 outputs OUT_MUX1 to the second variation comparator 340 (D0 or inverted D0, determined by the invert bit D_DBI[3:0] sent from the sixth register 360). The second variation comparator 340 compares D1 and OUT_MUX1 to obtain the invert bit B1. Similarly, at T20, T30, T40, . . . , the first variation comparator 330 outputs invert bits B2, B4, B6, . . . . At T21, 31, 41, . . . , the second variation comparator 340 outputs invert bits B3, B5, B7, . . . . Here, B0. B2, B4, . . . are called DBI[3:0], and B11, B3, B5, are called DBI[7:4]. The inverters 390 and 391 are used to invert data DOUT5/DOUT6 to obtain inverted data DOUT5_/DOUT6_. The multiplexers 310 and 320 determine which of DOUT5/DOUT6 (output from the fifth and seventh registers 350 and 370) or DOUT5_/DOUT6_(output from the inverters 390 and 391) to output according to the invert bit D_DBI[3:0]/D_DBI[7:4] sent from the sixth and eighth registers 360 and 380.

The data M2I[63:0] and M2I[127:64] output from the input data receiver 110 and the inverted bit DBI[3:0] and DBI[7:4] output from the invert bit generator 120 are transmitted to the data access apparatus 130. To distinguish from the invert bits DBI[3:0] and DBI[7:4], the invert bits output from the data access apparatus 130 are called DBI2 [3:0] and DBI2[7:4]It is known to one of ordinary skill in the art that DBI2[3:0] and DBI2[7:4] are essentially the same.

When the data access apparatus 130 accumulates a certain amount of data M2O[63:0], M2O[127:64] and invert bits DBI2[3:0] and DBI2[7:4], the data and invert bits are sent to the post data processor 150 for a further process. If the CPU bus is free, then the foregoing data can be directly exported. The post data processor 150 is used to adjust the frequency/bandwidth to fit to requirement by the CPU bus. Simultaneously, according to the inverted data of the DBI2, the variation for the data being transmitted to the CPU is reduced to the minimum.

Since the data access apparatus 130 only outputs the data and invert bit to the post data processor 150 after accumulating to a predetermined amount, idle state exists in the transmission path (such as the bus) between the data access apparatus 130 and the post data processor 150. To further reduce data inversion level, the invention adds an invert bit inspect apparatus between the data access apparatus 130 and the post data processor 150. The invert bit inspect apparatus compares the first data sent to the post data processor 150 with the idle state of the bus too reduce the data inversion level.

Figure 4:
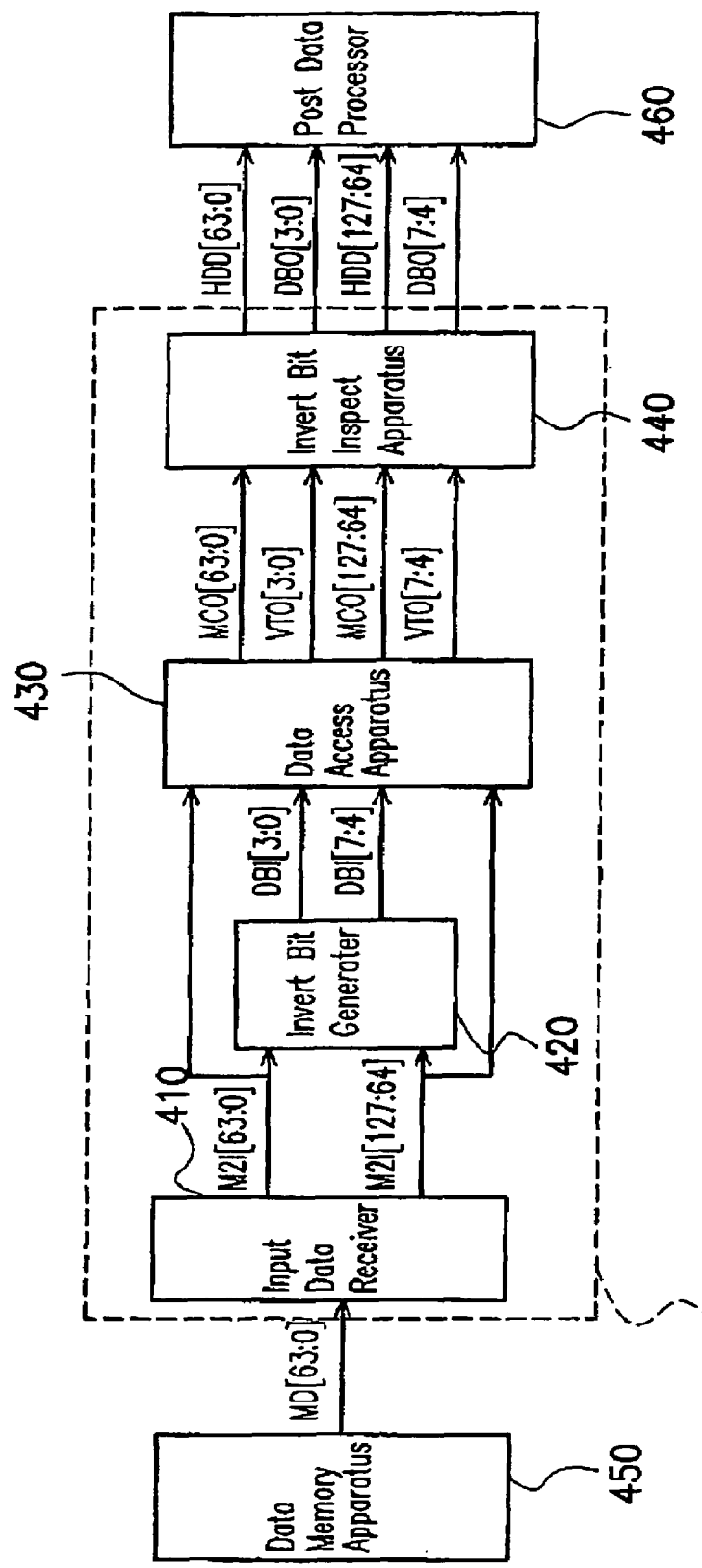
FIG. 4 is a block diagram of a data memory controller that supports data bus invert in another embodiment of the invention.

Referring to FIG. 4, a chip set in another embodiment of the invention is illustrated. The memory data processor 400 is coupled between the data memory apparatus 450 (such as DRAM) and the post data processor 460. The memory data processor 400 comprises an input data receiver 410, an invert bit generator 420, a data access apparatus 430 and an invert bit inspect apparatus 440. The functions and operations of the input data receiver 410, the invert bit generator 420, the data access apparatus 430 are similar to the input data receiver 110, the invert bit generator 120 and the data access apparatus 130. A further description is thus omitted.

Figure 5A:
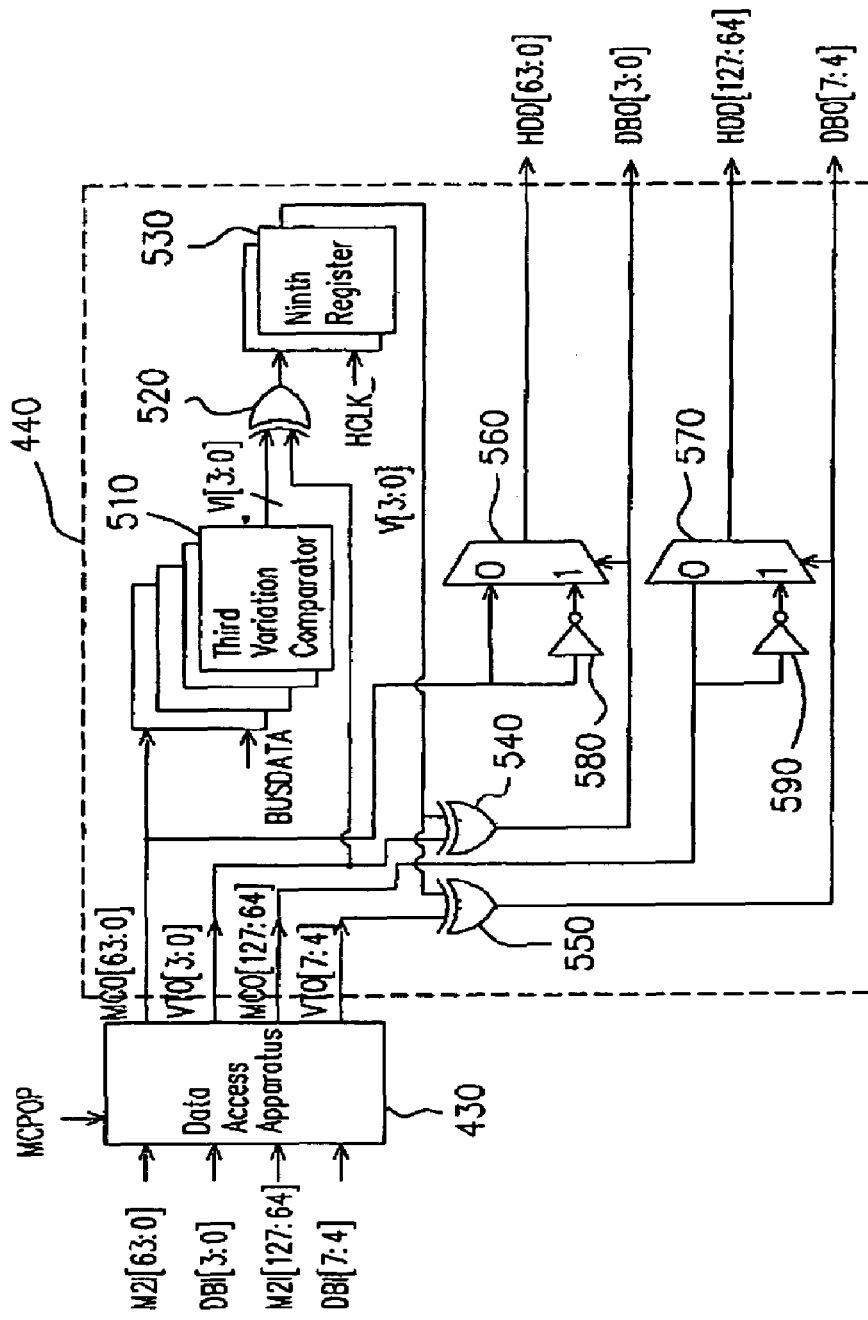
FIGS. 5a and 5b are a block diagram and clock diagram of the data invert inspect circuit in FIG. 4.
Figure 5B:
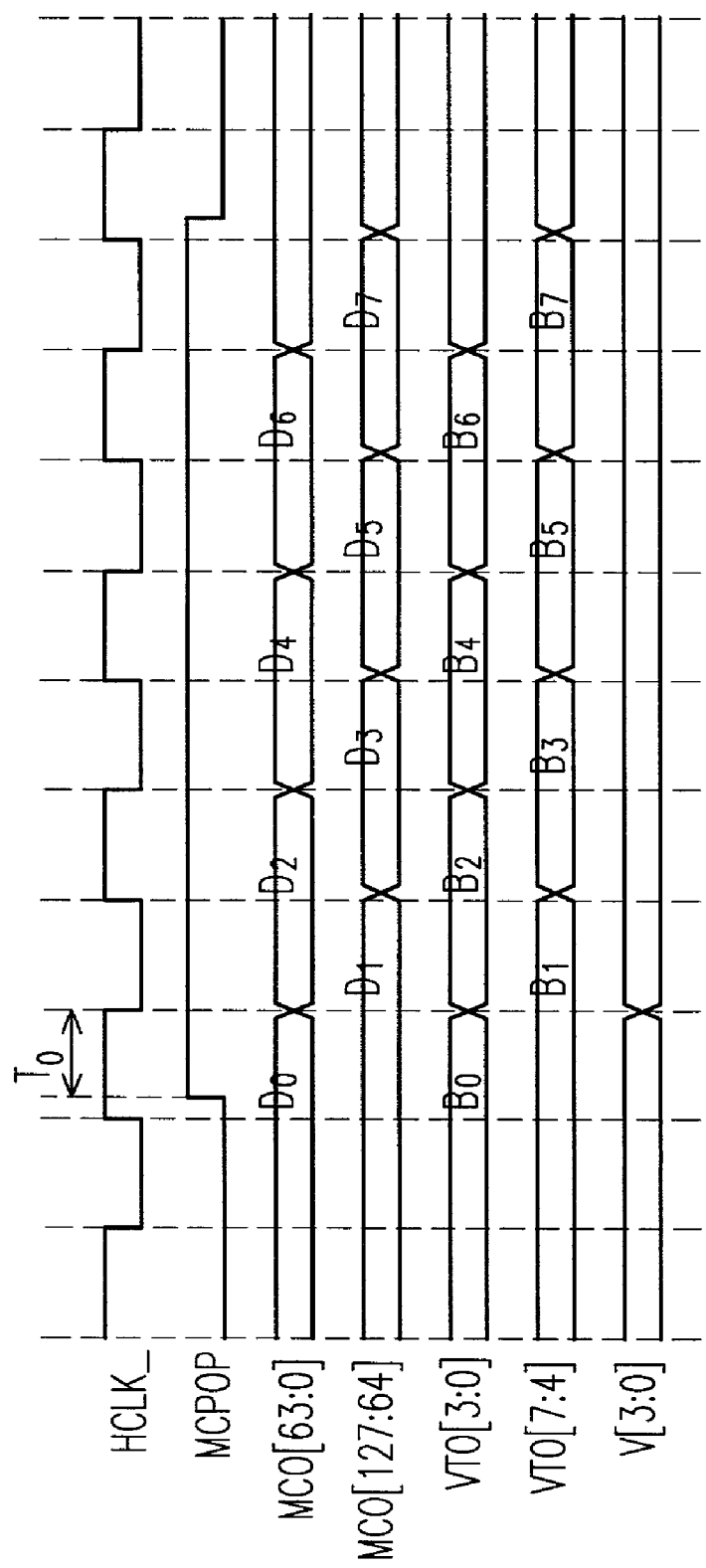

Referring to FIGS. 5*a* and 5*b*, a block diagram and a clock diagram of the invert bit inspect apparatus 440 are shown. According to the control signal POP, the data access apparatus 430 outputs data MCO[63:0] and MCO[127:64]In FIG. 5*b*, when POP is low, the data access apparatus 430 does not output data. That is, the bus is in an idle state. When POP converts to high, the data access apparatus 430 starts to output data. To the post data processor, D0 is the first data received after the idle state. Therefore, the invert bit inspect apparatus 440 further performs invert bit inspection on D0.

At time T0, the third variation comparator 510 receives D0 and bus data BUSDATA (the data represents the data on the bus when the bus is in the idle state) and obtains V1[3:0]The logic circuit 520 (such as EXOR) performs a logic calculation on V1[3:0] and DBI2[3:0] to obtain a result V[3:0], which is saved in the ninth register 530. It is to be noted that the calculation is performed within time T0 only. The DBI[3:0] and DI[3:0] are computed to obtain the result V[3:0], wherein V[3:0] is the parameter to determine whether or not the rest part of DBI2, such as B1, B2, . . . , are inverted. A true value is given as follows:

| DBI2[3:0] | VI[3:0] | Whether the remaining invert bit is to be inverted again. | V[3:0] |
| --- | --- | --- | --- |
| 0 | 0 | No | 0 |
| 0 | 1 | Yes | 1 |
| 1 | 0 | Yes | 1 |
| 1 | 1 | No | 0 |

When V[3:0] is 1, the occurring situation as shown in table, when the DBI2[3:0]=0 and V[3:0]=1 or DBI2[3:0]=1 and V1[3:0]=0, it means the obtained invert bit has to be inverted again. On the contrary, when V[3:0] is 0, the occurring situation as shown in table, when the DBI2[3:0]=0 and V1[3:0]=0 or DBI2[3:0]=1 and V1[3:0]=1, then the invert bit does not have to be inverted. After T0, the logic circuit 540 (such as EXOR) performs a logic calculation on V[3:0] and DBI[3:0] to obtain DBO[3:0]The logic circuit 550 (such as EXOR) performs a logic calculation on V[3:0] and DBI2[7:4] to obtain DBO[7:4]DBO[3:0] and DBO[7:4] in the post data processor 150 are reference for the multiplexers 560 and 570 to determine whether MCO[63:0]/MCO[127:64] or the inverted data by the inverter 580/590 thereof is to be output. The output data of the multiplexers 560 and 570 are denoted as HDD[63:0]/HDD[127:64].

According to the above, the invention has the following advantages. While continuously outputting memory data to the post data processor, the variation of the bus between chip set and the CPU is minimized to save power and achieve energy efficiency. In addition, the input terminal of the chip set to receive data uses bandwidth doubling and speed halving to enlarge the time margin for data processing. In addition, the foregoing example, is not limited to the CPU, it can also, for example, be applied between the AGP, memory Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A data memory controller that supports a data bus invert, coupled to a data memory apparatus and a post data processor, the data memory controller comprising:

an input data receiver, to receive a memory data from the data memory apparatus and then reduce a frequency of the memory data as well as increase a bandwidth of the memory data, and output a first data selected from the memory data in a way of sampling every sequential even number bit data of the memory data and a second data selected from the memory data in a way of sampling every sequential odd number bit data of the memory data;

an invert bit generator, to receive the first data and the second data, and to compare the first data with a previously received second data to obtain a first invert bit, and to compare the second data with a previously received first data to obtain a second invert bit;

a data access apparatus, receiving the first data, the second data, the first invert bit, and the second invert bit, and then output a fifth data, a sixth data, a third invert bit and a fourth invert bit; and an invert bit inspect apparatus, to compare an idle data and the fifth data to obtain an inspect bit, and to determine how to output the fifth data, the sixth data, the third invert bit and the fourth invert bit to the post data processor according to the inspect bit.

2. The memory data controller according to claim 1, wherein each frequency of the first data and the second data is less than tat of the memory data, and bandwidths of the first data and second data are greater than that of the memory data.

3. The memory data controller according to claim 2, wherein each frequency of the first data and the second data is half that of the memory data, and the bandwidths of the first data and second data are double that of the memory data.

4. The memory data controller according to claim 2, wherein the first data and the second data are produced from the memory data by an alternative sequence.

5. The memory data controller according to claim 1, wherein the input data receiver further comprises:

a first register, to temporarily store the memory data transmitted from the data memory apparatus and to output a first delay data;

a second register, to temporarily store the memory data transmitted from the data memory apparatus and to output a second delay data;

a third register, to temporarily store the memory data transmitted from the data memory apparatus and to output a third delay data;

a fourth register, to temporarily store the memory data transmitted from the data memory apparatus and to output a fourth delay data;

a first multiplexer, to output the first delay data or the third delay data; and a second multiplexer, to output the second or the fourth delay data.

6. The data memory controller according to claim 1, wherein the invert bit generator further compnses:

a first variation comparator, to receive the first data transmitted from the input data receiver;

a second variation comparator, to receive the second data transmitted from the input data receiver;

a fifth register, to temporarily store the first data transmitted from the input data receiver to obtain a third data;

a sixth register;

a seventh register, to temporarily store the second data transmitted from the input data receiver to obtain a fourth data;

an eighth register;

a first inverter, to receive the third data to generate an inverted third data;

a second inverter, to receive the fourth data to generate an inverted fourth data;

a third multiplexer, to receive the third data and the inverted third data; and a fourth multiplexer, to receive the fourth data and the inverted fourth data;

wherein the first variation comparator compares the first data and the first inverted data output from the fourth multiplexer according to an output of the eighth register to obtain the first invert bit; the second variation comparator compares the second data to the second inverted data output from the second inverter according to an output of the sixth register to obtain the second invert bit; an input of the first inverter is coupled to the sixth register, an input of the second inverter is coupled to the eighth register; the third multiplexer selects between the third data and the inverted third data to output according to the output of the sixth register; and the fourth multiplexer selects between the fourth data and the inverted fourth data to output according to the output of the eighth register.

7. The data memory controller according to claim 1, wherein the invert bit inspect apparatus further comprises:

a third variation comparator, to compare the idle data and the fifth data to obtain the inspect bit;

a first logic circuit, to calculate the inspect bit and the third invert bit;

a ninth register, to temporarily store an output of the first logic circuit;

a second logic circuit, to determine how to transmit the third invert bit to the post data processor according to an output of the ninth register; and a third logic circuit, to determine how to transmit the fourth invert bit to the post data processor according to an output of the second logic circuit.

8. The data memory controller according to claim 1, wherein the data memory controller includes a north bridge.

* * * * *